(12) United States Patent
Tsay

(10) Patent No.: US 6,979,093 B2
(45) Date of Patent: Dec. 27, 2005

(54) ACCESSORY ILLUMINATING DEVICE OF MOBILE PHONE

(76) Inventor: Wen-Feng Tsay, P. O. Box 24-108, Taipei (TW)

( * ) Notice: Subject to any disclaimer, the term of this patent is extended or adjusted under 35 U.S.C. 154(b) by 42 days.

(21) Appl. No.: 10/736,101

(22) Filed: Dec. 16, 2003

(65) Prior Publication Data

US 2005/0128747 A1    Jun. 16, 2005

(51) Int. Cl.⁷ .................. G03B 15/02; H04M 1/02; H04M 1/21; H04Q 7/32
(52) U.S. Cl. .............. 362/8; 362/11; 362/88; 362/253
(58) Field of Search .............. 362/253, 8, 11, 362/88

(56) References Cited

U.S. PATENT DOCUMENTS 5,592,066 A * 1/1997 Fan ........................ 320/113
2004/0085745 A1 * 5/2004 Yoshihara .................. 362/8

FOREIGN PATENT DOCUMENTS

JP      2001-320461    * 11/2001    .......... H04M 1/02

* cited by examiner

Primary Examiner—Thomas M. Sember
Assistant Examiner—James W Cranson, Jr.
(74) Attorney, Agent, or Firm—Troxell Law Office, PLLC

(57) ABSTRACT

This invention discloses an accessory illuminating device of a mobile phone, of which a switch is built in the mobile phone or embedded into a base of the mobile phone for controlling a battery to power on or off the illuminating device, and providing the illumination for an object photographed by a camera lens of the mobile phone. A circuit for driving a battery charger to charge the battery can be installed to the device, if needed. The lamp of the mobile phone is lit to provide an illumination in the photographing direction of an object or a scene, so that the photograph of such object or scene can be taken at night or in a dark environment, when electric power is supplied by controlling the switch. This invention provides the light for taking photographs by using the camera function of a mobile phone under poor lighting conditions, transmits clear photographs, and acts as a portable flashlight for a multiple of purposes and applications.

5 Claims, 5 Drawing Sheets

ACCESSORY ILLUMINATING DEVICE OF MOBILE PHONE

BACKGROUND OF THE INVENTION

I. Field of the Invention

This invention relates to illuminating devices, more particularly to an accessory illuminating device of mobile phones including a camera function. In general, the transmitted images of the photograph taken at night or in the environment with a poor light condition are blurred and not clear. An improved design builds a switch in the mobile phone or embeds a switch in the base of the mobile phone to control the power supply and turn on or off a lamp of the mobile phone, so that the lamp can provide an illumination at the photographing direction. Furthermore, a circuit connected to the battery charger is added, if needed, to charge the battery, so that an electric power is supplied to turn on or off the lamp by controlling the switch. Such arrangement provides an illumination in the photographing direction at an object or scene when the photograph is taken at night or in the environment with a poor light condition, and also improves the light condition for transmitting a clearer picture. The device of this invention can also be used as a portable flashlight for a multiple of purposes and applications.

II. Description of the Prior Art

Since a mobile phone is portable and convenient for the communications in addition to the severe competition and promotion among mobile phone manufacturers, mobile phones become a very popular appliance in our daily life, and almost everyone has a set or more. Advanced mobile phones generally come with a camera for synchronously transmitting photographs. However, the light is insufficient nighttime or in a dark environment, the image of the transmitted photograph will be blurred or unclear. Furthermore, for safety and emergency purposes, a portable flashlight is needed. However, not too many people would carry a flashlight with them all the time because it is not used until there is an emergency. Therefore, the traditional mobile phones should be further studied and improved.

SUMMARY OF THE INVENTION

In view of the shortcomings of the aforementioned conventional mobile phones, the inventor of the present invention based on years of experience in the mobile phone accessory industry to conduct extensive researches and experiments and solve the problems and overcome the shortcomings, and finally invented the "Accessory illuminating device of mobile phone" in accordance with this invention.

The primary objective of the invention is to provide an accessory illuminating device of a mobile phone by building a switch in the mobile phone or embedding a switch into the base of the mobile phone for controlling the battery to power on or off the illuminating device, and providing an illumination for an object shot by a camera lens of the mobile phone. A circuit for driving a battery charger to charge the battery can be installed to the device, if needed. The lamp of the mobile phone is lit to provide lighting in the photographing direction of an object or a scene, so that the photograph of such object or scene can be taken at night or in a dark environment, when electric power is supplied by controlling the switch.

The secondary objective of this invention is to provide an accessory illuminating device of a mobile phone by building a switch in the mobile phone or embedding a switch into the base of the mobile phone for controlling the battery to power on or off the illuminating device, and providing the illuminating and alerting effects. In addition to the telephone communication, the device of this invention can be used as a portable flashlight for a multiple of purposes and applications.

DESCRIPTION OF THE PREFERRED EMBODIMENT

Figure 1:
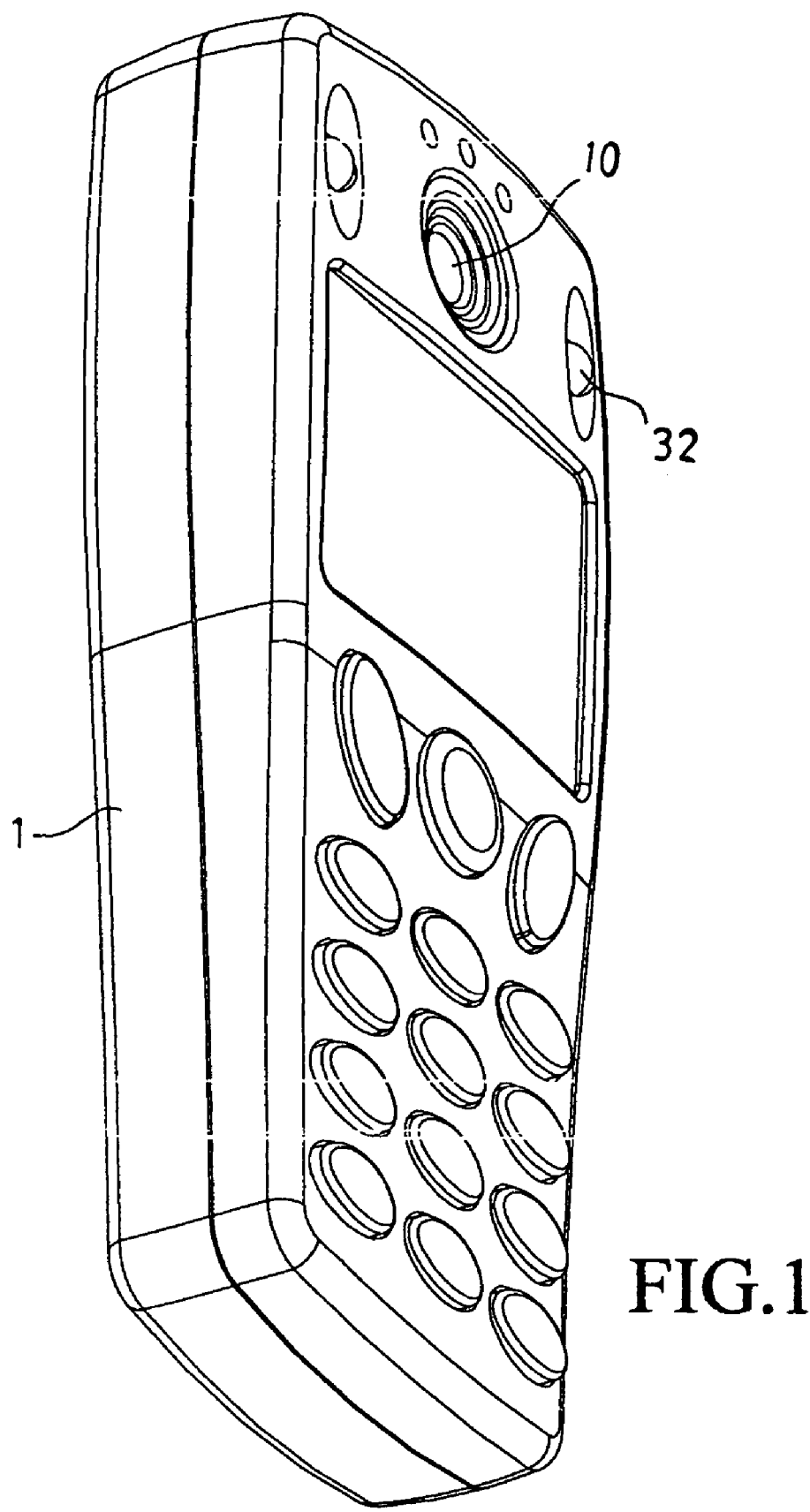
FIG. 1 is a perspective view of a preferred embodiment of the present invention.
Figure 2:
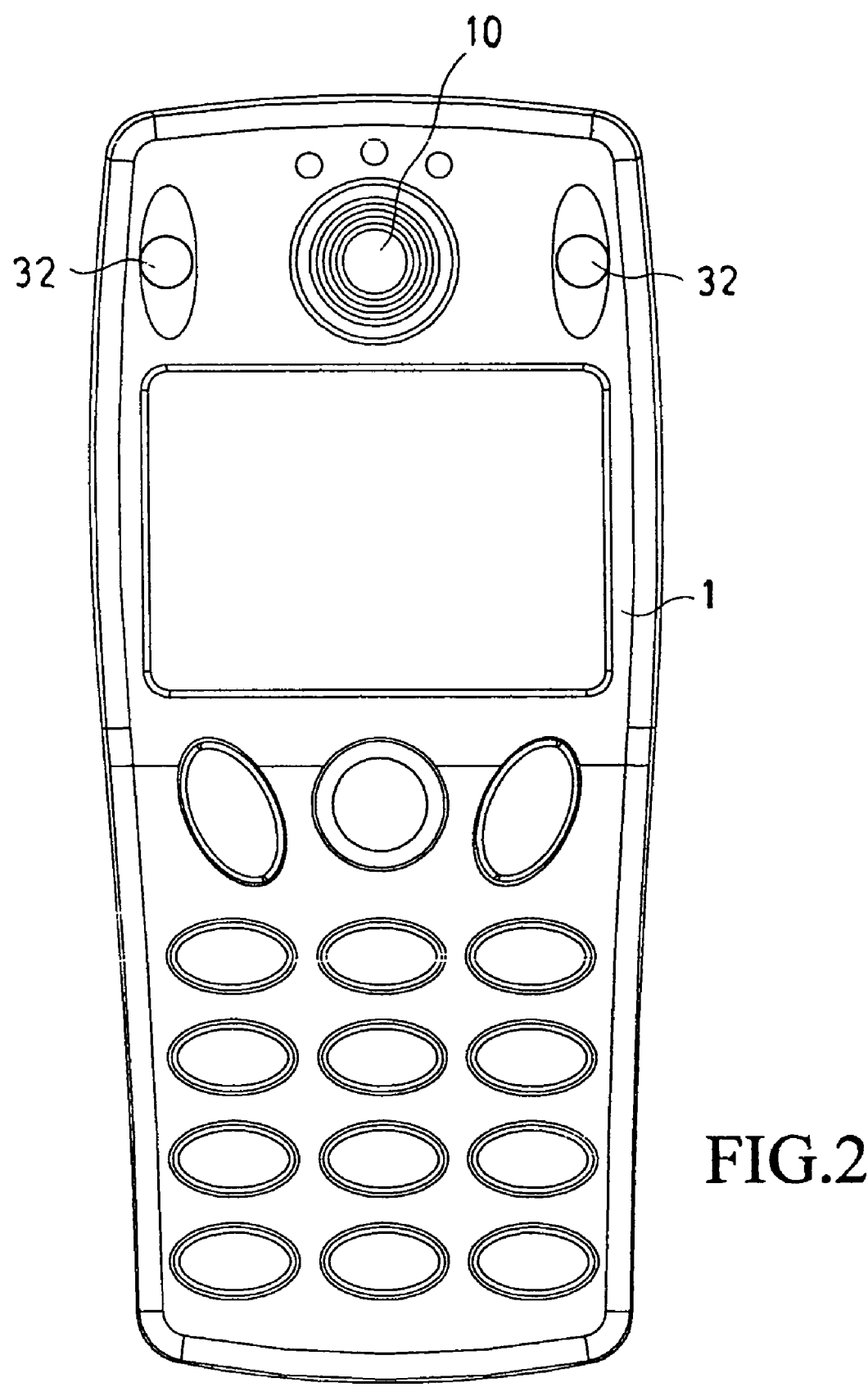
FIG. 2 is a front-view of a preferred embodiment of the present invention.
Figure 3:
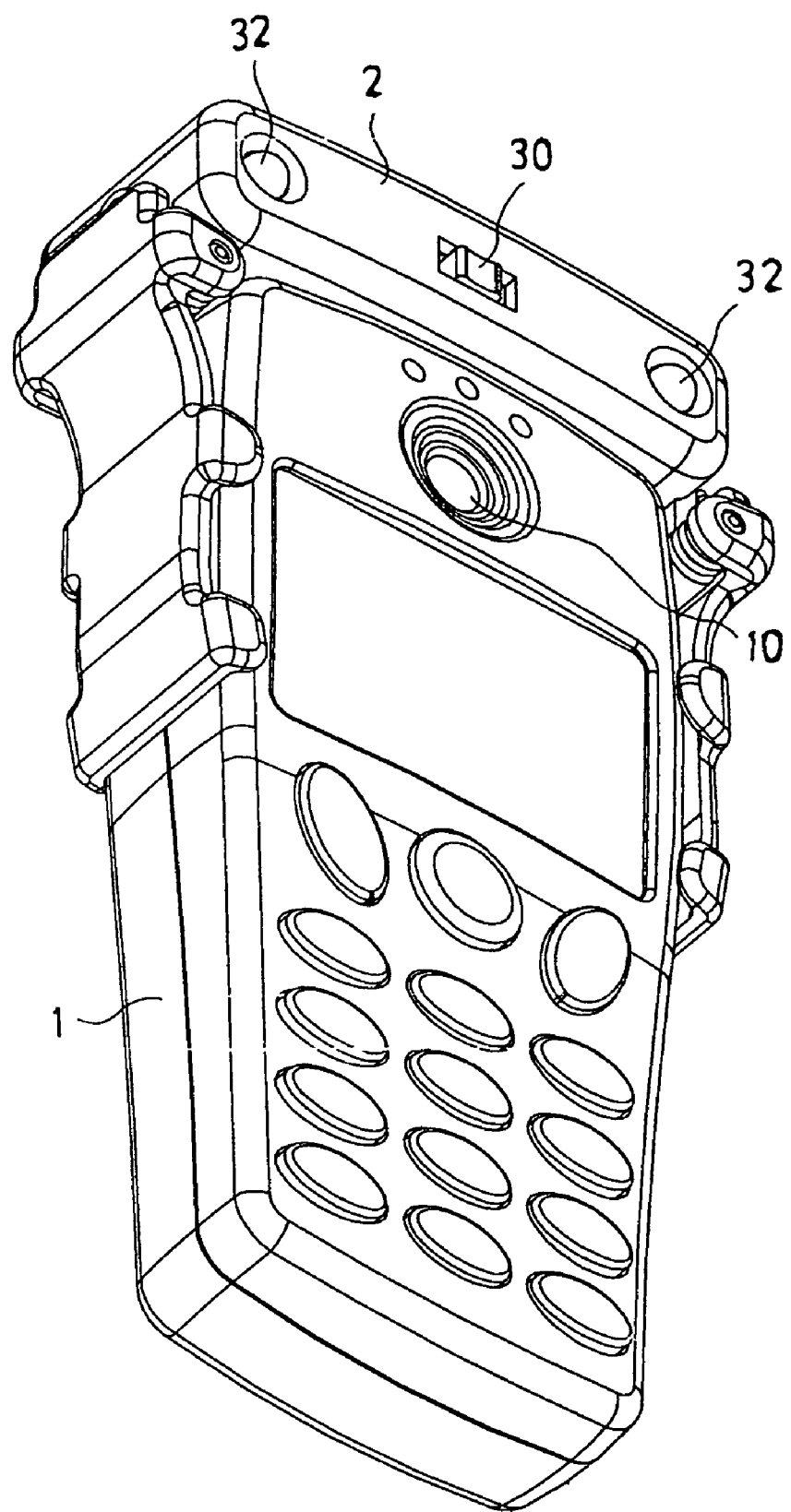
FIG. 3 is a perspective view of another preferred embodiment of the present invention.
Figure 4:
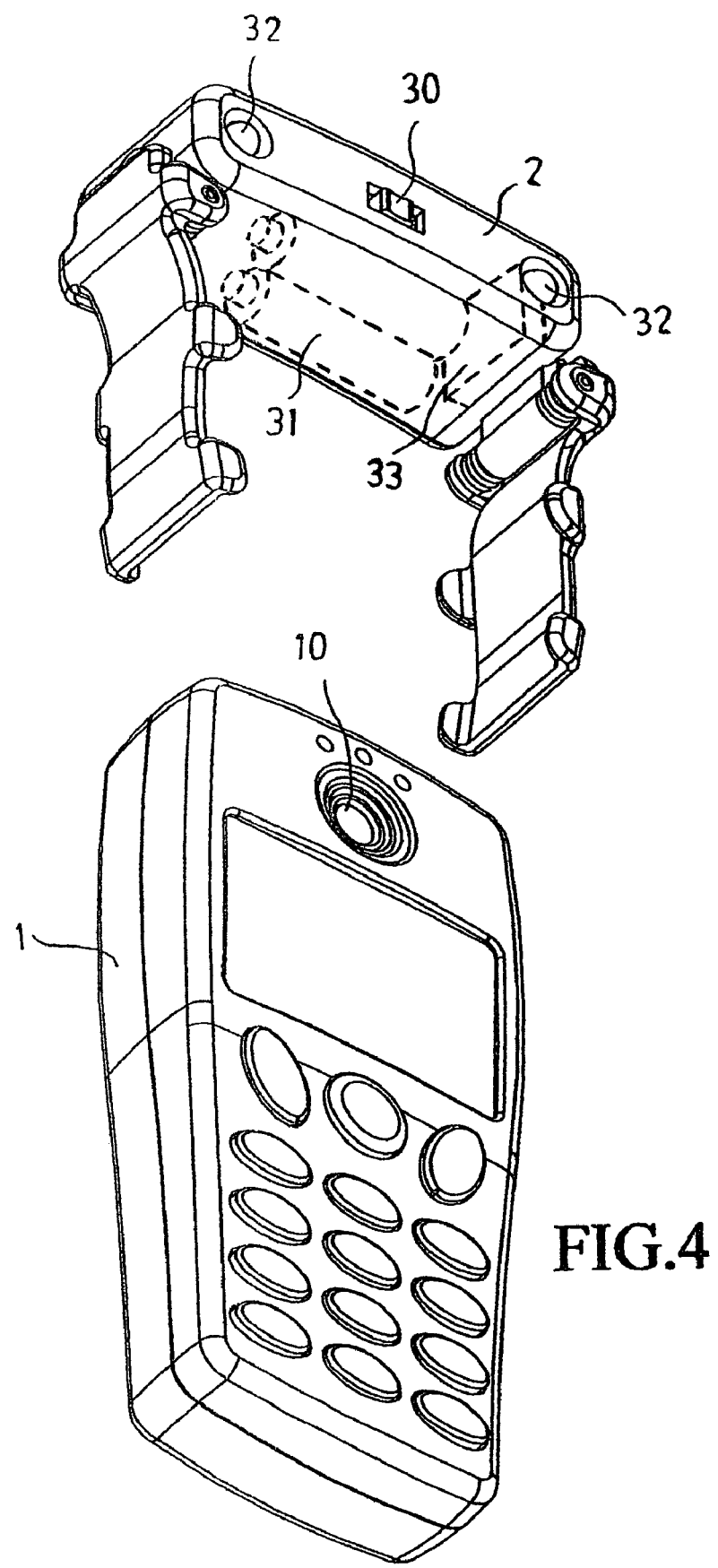
FIG. 4 is a perspective view of the disassembled parts of another preferred embodiment of the present invention.
Figure 5:
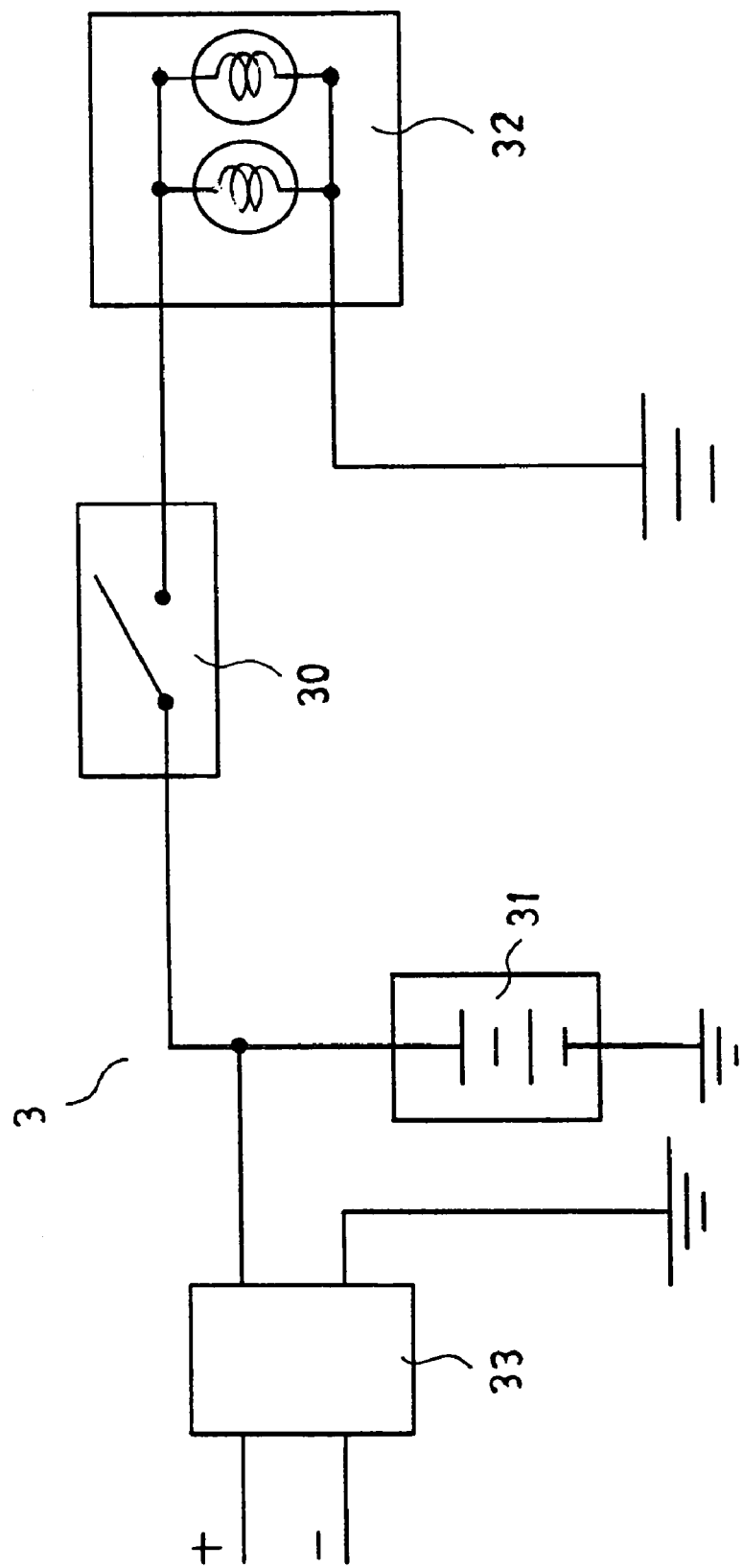
FIG. 5 is a block diagram of the circuit for the illuminating device of the present invention.

To make it easier for our examiner to understand the objective of the invention, its structure, innovative features, and performance, we use a preferred embodiment together with the attached drawings for the detailed description of the invention.

Referring to the figures, the present invention comprises a main body 1 of the mobile phone, an embedding base 2, and an illuminating device 3, wherein the main body 1 of the mobile phone is a general mobile phone having a camera lens 10 for taking and transmitting photographs as the one sold in the market, except this invention further comprises a switch 30 disposed on the main body 1 of the mobile phone or embedded into a base 2 of the mobile phone for controlling a battery 31 to supply electric power and turn on or off a lamp 32 of an illuminating device 3, such that the lamp produces an illumination effect at the photographing direction of the camera lens 10 of the mobile phone. The illuminating device 3 may further comprise a circuit electrically coupled to a battery charger 33 for charging the battery 31. To drive the camera lens 10 of the lamp 32 to give an even illumination and reduce shadows in the photographing direction, it is preferably to install at least two lamps 32 at different positions of the mobile phone. The lamp 32 can also be designed to be connected to the battery 31 of the main body 1 of the mobile phone through a circuit to reduce the volume and weight of the mobile phone. Further, the fixture and embedment between the base and the main body 1 of the mobile phone vary with the shapes of different mobile phones, and the way of embedding or fixing the mobile phone with the base is a general prior art. The figures only demonstrate one of the embodiments, and will not further describe the way of fixing the mobile phone with its base here.

In practical applications, if the lamp 32 is embedded or fixed onto the base 2, users can embed or fix the base 2 onto the main body 1 of the mobile phone. The lamp 32 can be connected to the battery 31 of the main body 1 of the mobile phone if necessary. If a user wants to transmit a photo taken at night or in a dark environment, the user can use the switch 30 to turn on the battery and supply electric power to the lamp 32, and thus driving the lamp to light up. An illumination effect will be produced at the photographing direction of the camera lens 10 of the mobile phone for taking the photograph of an object, a character, or a scene. Such illumination can improve the effect of transmitting a clearer picture, as well as turning on the light by the switch 30 to provide illuminations for roads, keyholes, dark places, contact persons, and the like at night or in a dark environment. In addition to telephone communications, the mobile phone also serves as a portable flashlight for a multiple of purposes and applications. When the power of the battery is low, the user can use the battery charger 33 to charge the battery 32 and maintain a continual use of the phone and lamp.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile phone assembly comprising:
    a) a mobile phone having a camera lens and transmitting pictures; and
    b) a embedding base removably connected to the mobile phone and having an illumination device having:
        i) at least one lamp producing an illumination in a photographing direction for a camera; and
        ii) a switch controlling a battery selectively supplying power to the at least one lamp.

2. The mobile phone assembly according to claim 1, wherein the at least one lamp includes two lamps.

3. The mobile phone assembly according to claim 1, wherein the battery is located in the phone, and the illumination device is connected to the battery through a circuit.

4. The mobile phone assembly according to claim 1, wherein the battery is located in the embedding base.

5. The mobile phone assembly according to claim 1, wherein the illumination device includes a circuit electrically coupled to a battery charger charging the battery.

* * * * *